United States Patent
Kunimatsu

(10) Patent No.: US 7,173,894 B2
(45) Date of Patent: Feb. 6, 2007

(54) ROM-RAM MEDIUM AND STORAGE DEVICE THEREOF

(75) Inventor: Yasukiyo Kunimatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 47 days.

(21) Appl. No.: 11/033,242

(22) Filed: Jan. 11, 2005

(65) Prior Publication Data

US 2005/0141401 A1 Jun. 30, 2005

Related U.S. Application Data

(63) Continuation of application No. PCT/JP02/08833, filed on Aug. 30, 2002.

(51) Int. Cl.
  *G11B 5/09* (2006.01)
  *G11B 7/24* (2006.01)
(52) U.S. Cl. .................. 369/59.25; 369/275.3
(58) Field of Classification Search ............. 369/59.25, 369/275.3
  See application file for complete search history.

(56) References Cited

U.S. PATENT DOCUMENTS

| 5,706,271 | A  | * | 1/1998 | Hashimoto ........ | 369/53.37 |
| 6,654,547 | B1 | * | 11/2003 | Maeda et al. ..... | 386/125 |
| 2005/0041538 | A1 | * | 2/2005 | Aoyama et al. .... | 369/13.05 |

FOREIGN PATENT DOCUMENTS

| JP | 6-349248 | 12/1994 |
| JP | 7-57264 | 3/1995 |
| JP | 7-065375 | 3/1995 |
| JP | 9-82023 | 3/1997 |
| JP | 9-312039 | 12/1997 |
| JP | 10-116468 | 5/1998 |
| JP | 2000-123479 | 4/2000 |
| JP | 2002-133787 | 5/2002 |
| JP | 2002-150675 | 5/2002 |

OTHER PUBLICATIONS

Chikazawa et al.; "Feasibility Study of Concurrent ROM-RAM Optical Disk"; Journal of the Institute of Television Engineers of Japan; vol. 46, No. 10, pp. 1319-1324; 1992.

* cited by examiner

*Primary Examiner*—William Korzuch
*Assistant Examiner*—Adam R. Giesy
(74) *Attorney, Agent, or Firm*—Greer, Burns & Crain, Ltd.

(57) ABSTRACT

A ROM-RAM recording medium includes a ROM portion in which main information is recorded by a physical change on an optically transparent substrate and a RAM portion formed on the ROM portion as a recording layer that allows writing of main information at least once. The ROM portion is provided with a sub-code area for recording sub-information. A sub-code area for recording sub-information is provided in the RAM portion arranged at physically substantially the same position as the sub-code area of the ROM portion in a track direction.

7 Claims, 13 Drawing Sheets

| OPERATIONAL MODE | LD FEEDBACK SIGNAL | ROM DETECTION | RAM DETECTION |
|---|---|---|---|
| SIMULTANEOUS REPRODUCTION OF ROM AND RAM | ROM1 | ROM2 | RAM |
| | ROM2 | ROM1 | — |
| REPRODUCTION OF ROM ONLY | ROM1 | — | RAM |
| REPRODUCTION OF RAM ONLY | ROM2 | ROM1 | — |
| ROM REPRODUCTION AND RAM WRITING | | | |

600

| S0 S1 | CONTROL | ADDRESS | DATA | CRC |
|---|---|---|---|---|
| 2 | 4 | 4 | 72 BITS | 16 |
| 601 | 602 | 603 | 604 | 606 |

…

ROM-RAM MEDIUM AND STORAGE DEVICE THEREOF

CROSS-REFERENCE TO RELATED APPLICATION

This application is a U.S. continuation application, filed under 35 USC 111(a) and claiming the benefit under 35 USC 120 and 365(c), of PCT application PCT/JP2002/008833, filed Aug. 30, 2002. The foregoing application is hereby incorporated herein by reference.

BACKGROUND OF THE INVENTION

1. Field of the Invention

The present invention generally relates to optical recording media, and more particularly, to a ROM-RAM recording medium that includes: a ROM portion having an optically transparent substrate on which main information is recorded by physical change such as an irregularity formed as, for example, pits; and a RAM portion formed on the ROM portion as a recording layer that allows writing of main information at least once, wherein a sub-code region for recording sub-information is provided in the ROM portion, and to a storage device for such a ROM-RAM recording medium.

2. Description of the Related Art

Conventional media having both ROM (Read-Only Memory) part and RAM (Random Access Memory) part therein include, for example, a so-called partial ROM medium. In the ROM portion, information is recorded by physical change such as an irregularity formed as, for example, pits. In the RAM portion, a recording layer that allows writing or overwriting is formed. In the partial ROM medium, the ROM portion and the RAM portion are formed on separate regions of a single disk.

In such a medium having both ROM portion and RAM portion on a single optical disk, synchronization flags for establishing synchronization between signals reproduced from the ROM portion and the RAM portion are embedded in data recorded in the ROM portion and the RAM portion of the optical disk. When reproducing data, the synchronization flags are recognized by a read channel and data reproduced from the ROM portion and the RAM portion are combined again to perform reproduction.

However, as mentioned above, in a partial ROM medium, a ROM portion and a RAM portion are formed on separate regions of a single optical disk. Accordingly, in such a system that reproduces data recorded in the ROM portion and the RAM portion, and combines and uses the data, it is necessary to access the ROM portion and the RAM portion by an optical pickup and reproduce data from each of the regions. Thus, it is necessary for the optical pickup to constantly move between and access the ROM portion and the RAM portion. Hence, there is a significant time delay until data reproduced from the ROM portion and the RAM portion and to be synchronized are sent from the optical pickup to the read channel. Consequently, reliability of the reproduced data has been low.

Additionally, in a rewritable medium, access history of regions to be accessed and user information such as kinds of registration information are written and recorded in control tracks. However, since it is impossible to secure a large capacity for the control tracks, the amount of information that can be written therein has been limited.

On the other hand, in a so-called concurrent ROM-RAM medium, which includes a ROM portion having an optically transparent substrate on which information is recorded by physical change such as an irregularity, and a RAM portion formed on the ROM portion as a recording layer and allowing writing at least once, it is possible to concurrently handle data of the ROM portion and the RAM portion.

As for concurrent ROM-RAM media, a concurrent ROM-RAM optical disk that allows simultaneous reproduction of the ROM portion and the RAM portion is described in, for example, an article titled "Feasibility Study of Concurrent ROM-RAM Optical Disk" in The Journal of the Institute of Television Engineers of Japan, Vol. 46, No. 10, pp. 1319–1324, published in 1992.

However, in order to concurrently handle data of the ROM portion and that of the RAM portion, it is necessary to recognize relationships between the data recorded in the ROM portion and that in the RAM portion with a simple method.

Additionally, in a concurrent ROM-RAM medium, general contents such as a movie and music are recorded in the ROM portion, and in many cases, the recorded contents are used by multiple users. Hence, in terms of data protection and copyright protection, methods are required for managing access history and the like, recording user information such as various kinds of registration information, and identifying users who desire to use the concurrent ROM-RAM medium. It is necessary that such methods can be performed as simply as possible.

SUMMARY OF THE INVENTION

A general object of the present invention is to provide an improved and useful concurrent ROM-RAM medium and storage device therefor in which one or more of the above-mentioned problems are eliminated.

Another and more specific object of the present invention is to provide a concurrent ROM-RAM medium that allows recording of, for example, user information and relationships between main information or data recorded in the ROM portion and that in the RAM portion with a simple method, and to provide a storage device that records information on and/or reproduces information from such a concurrent ROM-RAM medium.

In order to achieve the above-mentioned objects, according to one aspect of the present invention, there is provided a ROM-RAM recording medium including a ROM portion in which main information is recorded by a physical change on an optically transparent substrate and a RAM portion formed as a recording layer on the ROM portion and allowing writing of main information at least once, the ROM portion being provided with a sub-code area for recording sub-information, wherein a sub-code area for recording sub-information is provided in the RAM portion arranged at physically substantially the same position as that of a sub-code area of the ROM portion in a track direction.

According to the above-mentioned aspect of the present invention, by providing a sub-code area in the RAM portion at a position close to or substantially the same as a sub-code area of the ROM portion, it is possible to add various kinds of management information to the data of the RAM portion.

In an embodiment of the present invention, information for associating the main information of the ROM portion with main information of the RAM portion may be recorded in the sub-code area of the RAM portion.

With the above-mentioned embodiment, since the association information is recorded in the sub-code area of the RAM portion, it is unnecessary to re-access the lead-in area during data reproduction. Hence, it is possible to perform seamless reproduction having high reliability.

In an embodiment of the present invention, the main information of the RAM portion associated with the main information of the ROM portion may be recorded at a position seamlessly reproduced when reading the main information of the RAM portion.

With the above-mentioned embodiment, it is possible to record the data of the RAM portion associated with the data of the ROM portion in the same recording track as the data of the ROM portion. Thus, access by a lens actuator does not occur. Hence, it is possible to perform seamless reproduction having higher reliability.

In an embodiment of the present invention, user registration information may be recorded in the sub-code area provided in a lead-in area of the RAM portion, and access management information based on the user registration information may be recorded in the sub-code area provided in a data recording area of the RAM portion.

With the above-mentioned embodiment, since the access management information is recorded in the sub-code area of the data part of the RAM portion, it is unnecessary to re-access the lead-in area during data reproduction. Hence, it is possible to perform seamless reproduction having high reliability while protecting data.

In an embodiment of the present invention, the access management information based on the user registration information recorded in the sub-code area provided in the data recording area of the RAM portion may include the type of concurrent reproduction permission of the main information of the ROM portion and the main information of the RAM portion.

With the above-mentioned embodiment, since the access management information related to the type of permission for concurrent reproduction is recorded in a sub-code area of the data part of the RAM portion, it is possible to perform reproduction in a different mode for each user in a seamless manner without accessing the lead-in area for each reproduction data.

In an embodiment of the present invention, data access count information may be recorded in the sub-code area provided in the lead-in area of the RAM portion, and the data access count information may include history information of concurrent reproduction of ROM data and RAM data.

With the above-mentioned embodiment, since the history information of concurrent reproduction of the data of the ROM portion and the data of the RAM portion is recorded in a sub-code area in the lead-in area, it is possible to quickly gather information.

Additionally, according to another aspect of the present invention, there is provided a storage device that records information on or reproduces information from a ROM-RAM recording medium, the ROM-RAM recording medium including a ROM portion in which main information is recorded by a physical change and a RAM portion formed as a recording layer on the ROM portion and allowing writing of main information at least once, wherein a sub-code area for recording sub-information is provided in the RAM portion at substantially the same position as a sub-code area of the ROM portion in a track direction.

According to the above-mentioned aspect of the present invention, it is possible to record information on or reproduce information from the above-mentioned ROM-RAM medium.

Additionally, according to another aspect of the present invention, there is provided a storage device that records information on or reproduces information from a ROM-RAM recording medium including a ROM portion in which main information is recorded by a physical change and a RAM portion formed as a recording layer on the ROM portion and allowing writing of main information at least once, the storage device including a user identification part including:

a lock generation part that generates a lock based on ROM information and RAM information;

a key generation part that generates a key based on the lock; and a detector that detects a match between the key generated based on the lock and a key input to the storage device.

The ROM information unique to each medium is used when allowing usage of the medium. The ROM information is known as a medium ID. For example, a lock and a key for identifying an owner are generated from the medium ID information, and the owner obtains the key when purchasing the medium. Thereby, the owner can access the medium. Since a ROM-RAM medium generally contains contents in the ROM portion thereof, it is assumable that multiple users exist. According to the above-mentioned aspect of the present invention, a lock and a key for user identification are generated based on information obtained by combining, for example, the medium ID information, which is the ROM information, and the RAM information, which is created by the owner. A user may obtain the key information from the owner by some means. Generally, the owner manages multiple media. Accordingly, it is burdensome to create locks and keys without overlapping and to manage them. With the use of information of a medium ID, which is ROM information unique to each medium, as a part of information forming the basis for generating a lock and a key, even if the owner assigns the same RAM information with respect to the same user, different locks and keys are generated for each medium. Hence, it is possible to protect data more securely.

In a storage device according to an embodiment of the present invention, the ROM information and the RAM information may be recorded at physically substantially the same position in a track direction.

In an embodiment of the present invention, the ROM information used for generating a lock and a key for identifying a user is not limited to a medium ID, and ROM information provided in another area may be used. For example, RAM information created by the owner may be recorded in a sub-code area for recording the ROM information and a sub-code area of the RAM portion physically substantially the same as or close to the sub-code area for recording ROM information, and a lock and a key for user identification may be generated based on the ROM information and the RAM information read by ROM-RAM concurrent reproduction. As mentioned above, information forming the basis for generating a lock and a key may be recorded in any area on a medium. Hence, confidentiality of the recording position of a lock and a key is increased, and unnecessary accesses for user identification are further decreased.

Other objects, features and advantages of the present invention will become more apparent from the following detailed description when read in conjunction with the following drawings.

DETAILED DESCRIPTION OF THE PREFERRED EMBODIMENTS

A description is given below of embodiments for implementing the present invention with reference to the drawings.

Figure 1:
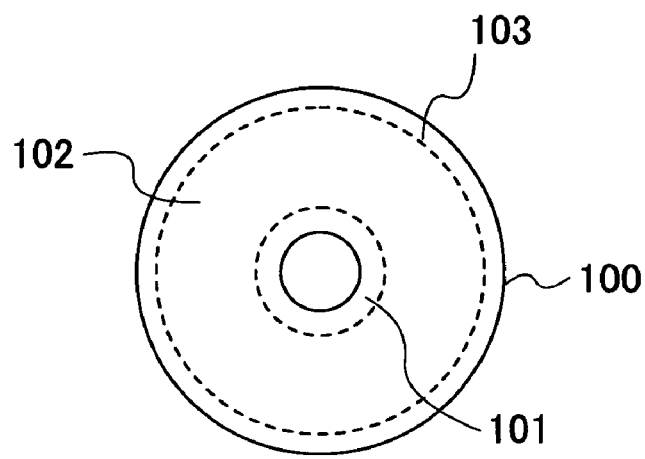
FIG. 1 is a schematic diagram showing a concurrent ROM-RAM medium according to the present invention.
Figure 2:
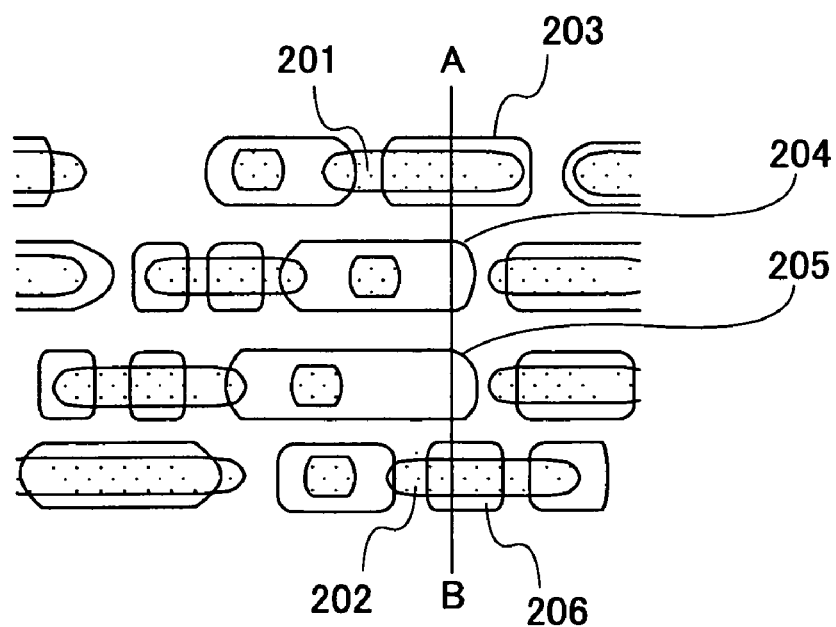
FIG. 2 is a schematic diagram showing recording marks of the concurrent ROM-RAM medium according to the present invention.
Figure 3:
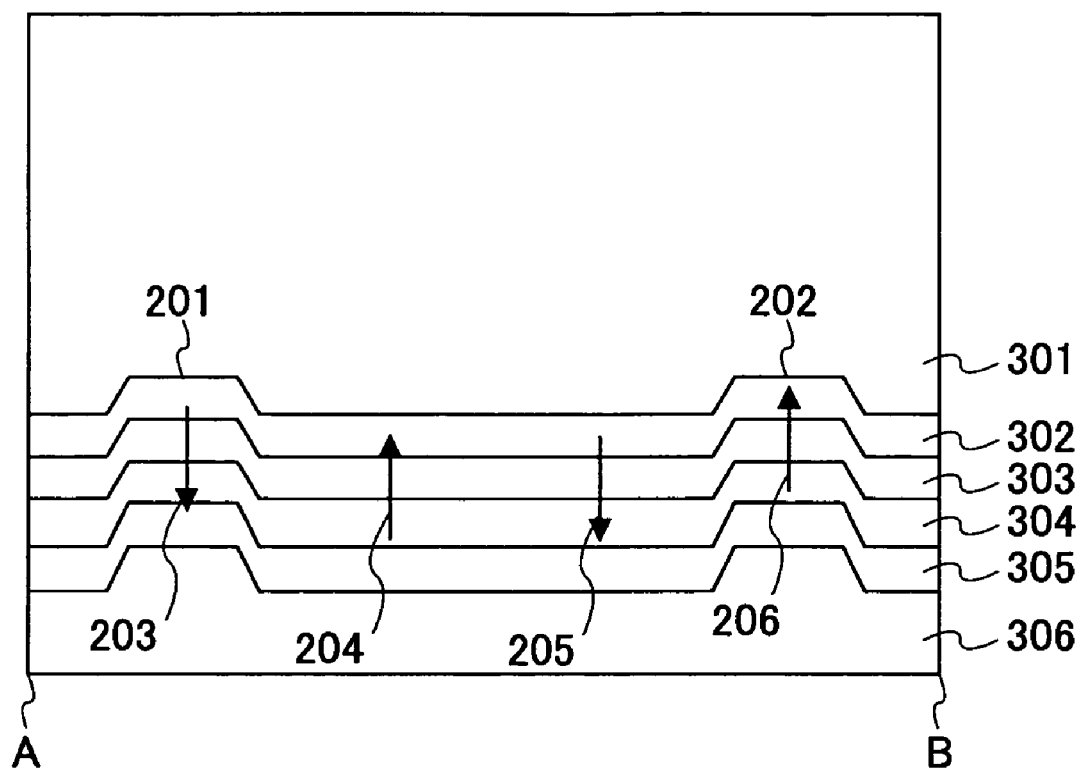
FIG. 3 is a cross-sectional view of the concurrent ROM-RAM medium according to the present invention.

FIG. 1 shows a concurrent ROM-RAM medium 100 according to the present invention. FIG. 2 shows recording marks on the concurrent ROM-RAM medium 100 according to the present invention. FIG. 3 is a cross-sectional view of the concurrent ROM-RAM medium 100 according to the present invention.

The concurrent ROM-RAM medium 100 according to the present invention, which medium is shown in FIG. 1, is a ROM-RAM optical disk. The concurrent ROM-RAM medium 100 includes tracks formed thereon in a spiral manner, and includes a lead-in area 101, a data recording area 102, and a lead-out area 103 from the inner tracks to the outer tracks. In the ROM-RAM optical disk shown in FIG. 1, as in a compact disk (CD), the lead-in is formed in the area within approximately 50 mm radium from the center. Phase pits are formed over substantially the entire surfaces of the lead-in area 101, the data recording area 102, and the lead-out area 103, and a recording layer is formed on the phase pits.

FIG. 2 shows the recording marks recorded on the concurrent ROM-RAM optical disk 100 according to the present invention. The ROM-RAM optical disk 100 includes both marks formed by the above-mentioned pits such as marks 201 and 202, and marks recorded in the recording layer such as marks 203, 204, 205 and 206. A line segment AB indicates a line along a cross section that is perpendicular to the tracks.

The data areas to be recorded may be somewhat shifted in a track direction between the ROM portion and the RAM portion.

FIG. 3 is a cross-sectional view of the ROM-RAM optical disk 100 according to the present invention. The ROM-RAM optical disk 100 according to the present invention includes a substrate 301, a dielectric layer 302, a magneto-optical recording layer (perpendicular magnetic layer) 303, a dielectric layer 304, a reflection layer 305, and an overcoat layer 306. The signs A and B in FIG. 3 correspond to the end A and the end B of the line segment shown in FIG. 2, respectively. FIG. 3 is the cross-sectional view along the line segment AB shown in FIG. 2. Pits 201 and 202 in FIG. 3 correspond to the marks 201 and 202 in FIG. 2, respectively. In addition, arrows 203 through 206 in FIG. 3 indicate the magnetizing directions in the magneto-optical recording layer 303 of the recording marks 203 through 206 in FIG. 2, respectively. In this embodiment, the magnetizing directions are perpendicular to the magneto-optical recording layer 303.

Next, a description is given of an embodiment of a recording/reproducing apparatus for the concurrent ROM-RAM optical disk 100 according to the present invention.

Figure 4:
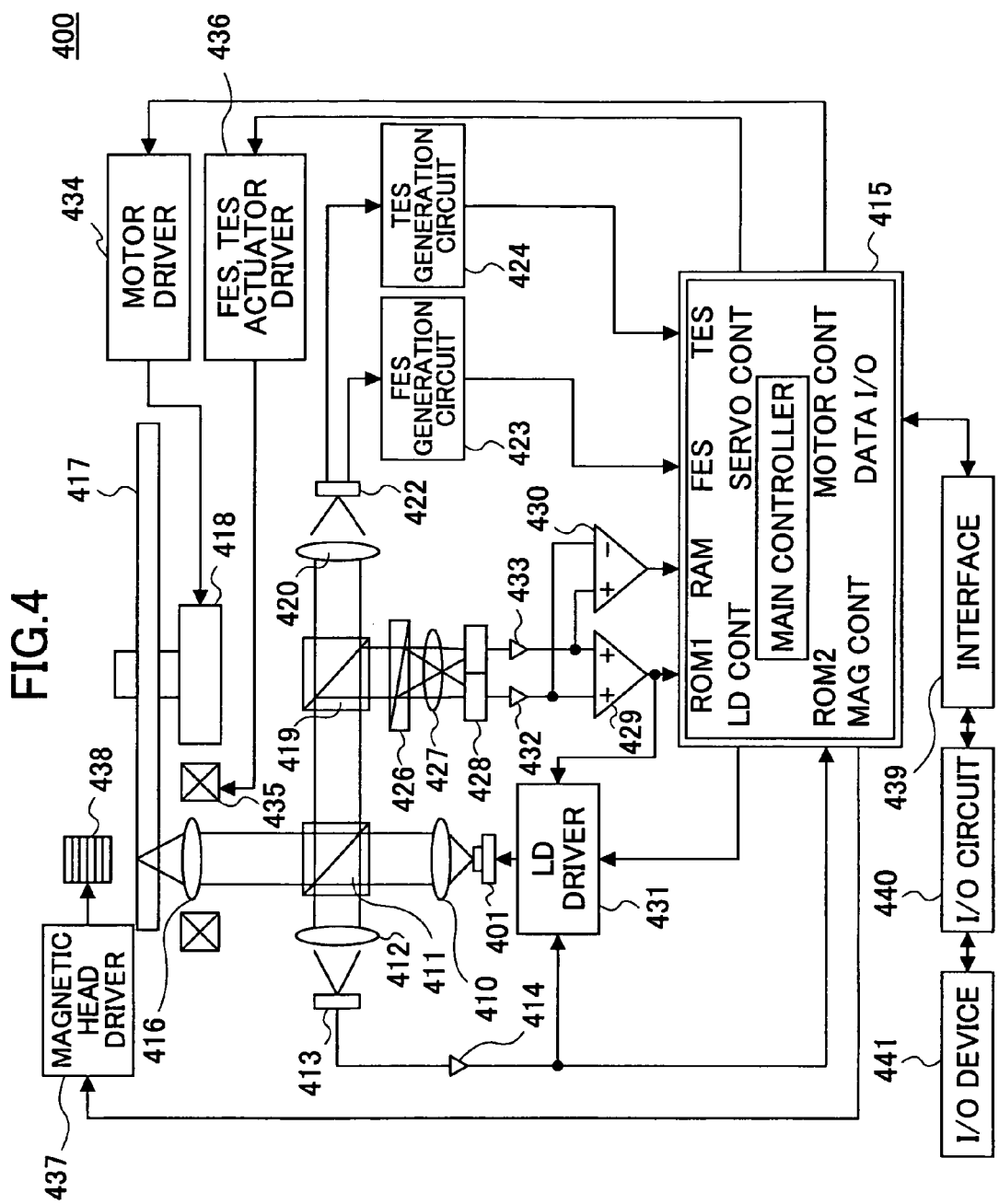
FIG. 4 is a block diagram showing a ROM-RAM medium and an exemplary structure of a recording/reproducing apparatus therefor.

FIG. 4 shows an embodiment of a ROM-RAM medium 417 and a recording/reproducing apparatus 400 therefor. The recording/reproducing apparatus 400 in FIG. 4 includes a laser diode LD 401, a collimator lens 410, a deflection beam splitter 411, a condenser lens 412, an APC photodetector 413, an amplifier 414, a main controller 415, an objective lens 416, a motor 418, a second deflection beam splitter 419, a condenser lens 420, a divided-by-four photodetector 422, a focus error signal (FES) generation circuit 423, a tracking error signal (TES) generation circuit 424, a 2-beam Wollaston prism 426, a condenser lens 427, a divided-by-two photodetector 428, a summing amplifier 429, a differential amplifier 430, a laser diode (LD) driver 431, amplifiers 432 and 433, a motor driver 434, a focus and track actuator 435, a focus and track actuator driver 436, a magnetic head driver 437, a magnetic head 438, an interface 439, and an input/output (I/O) circuit 440. The input/output circuit 440 is connected to an input/output device 441.

When recording information on a recording layer of the ROM-RAM medium 417, information to be recorded is input to the main controller 415 from the input/output device 441 via the input/output circuit 440 and the interface 439. The main controller 415 transmits a recording signal to the laser diode driver 431 and the magnetic head driver 437. The laser diode driver 431 controls the laser diode 401 such that writing laser light is emitted therefrom. The laser light is collimated into parallel light by the collimator lens 410. The parallel light is converged and directed onto the ROM-RAM medium 417 by the objective lens 416 in the actuator 435. On the other hand, the magnetic head driver 437 controls the magnetic head 438 in accordance with the recording signal, thereby recording information on the recording layer of the ROM-RAM medium 417.

A ROM signal and a RAM signal are reproduced from the ROM-RAM medium 417 in the following manner.

Reading laser light emitted from the laser diode 401 is collimated into parallel light by the collimator lens 410. The parallel light is converged and directed onto the ROM-RAM medium 417 by the objective lens 416 in the actuator 435. Reflected light from the ROM-RAM medium 417 is directed to the condenser lens 412 and the second deflection beam splitter 419 by means of the deflection beam splitter 411. The second deflection beam splitter 419 divides and transmits the entering light to the condenser lens 420 and the 2-beam Wollaston prism 426.

The light directed to the condenser lens 420 enters the divided-by-four photodetector 422. Based on the output of the divided-by-four photodetector 422, the focus error signal generation circuit 423 and the track error signal generation circuit 424 generate and transmit, to the main controller 415, a focus error signal and a tracking error signal, respectively. A servo controller (servo cont) in the main controller 415 transmits a focus and track control signal to the focus and track actuator driver 436. The actuator 435 is driven by the focus and track actuator driver 436, thereby performing position control of the actuator 435.

On the other hand, the light entering the 2-beam Wollaston prism 426 passes through the condenser lens 427 and enters the divided-by-two photodetector 428. The outputs of the divided-by-two photodetector 428 pass through the amplifiers 432 and 433. Then, a ROM1 signal, which is a phase pit signal, is generated by the summing amplifier 429, and a RAM signal, which is a MO signal, is generated by the differential amplifier 430. The ROM1 signal and the RAM signal are transmitted to the main controller 415.

Control by the laser diode driver 431 is performed in the following manner. The reflection light from the ROM-RAM medium 417, which is reflected by the deflection beam splitter 411, is converged by the condenser lens 412 and enters the APC photodetector 413.

An output signal of the APC photodetector 413 is amplified by the amplifier 414. An output signal of the amplifier 414 is a ROM2 signal, and an output signal of the summing amplifier 429 is the ROM1 signal.

In addition, a control signal LD CONT for controlling the laser diode 401 is output from the main controller 415 to the laser diode driver 431. The control signal LD CONT, which is for controlling the laser diode 401 and is output from the main controller 415, is a basic power instruction for reading or writing.

Here, control of the laser diode by the ROM2 signal, which is obtained by amplifying the signal output from the APC photodetector 413, and the ROM1 signal, which is the output signal from the summing amplifier 429, is referred to as LD feedback.

Figures 5, 6:
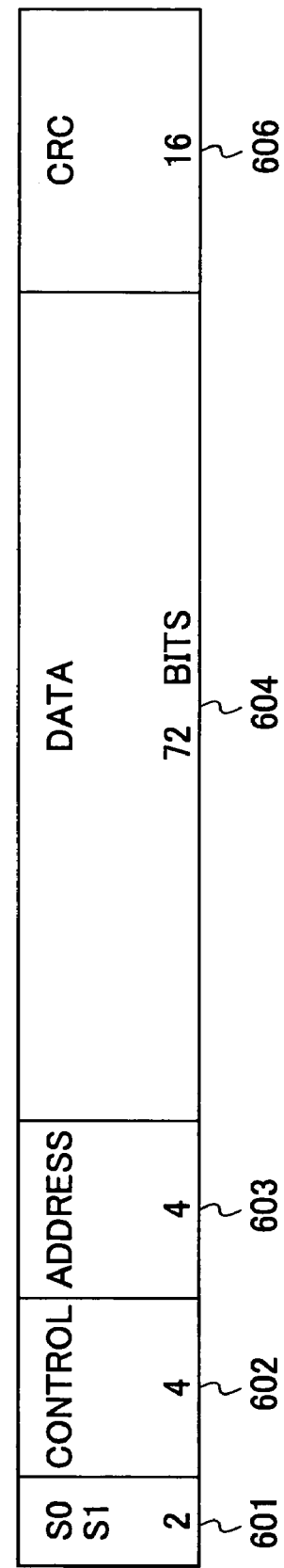
FIG. 5 is a table showing a LD feedback signal, a ROM reproduction signal, and a RAM reproduction signal for each operational mode.
FIG. 6 is a schematic diagram showing the structure of a sub-code of a data part of a compact disk.

FIG. 5 shows a LD feedback signal, a ROM reproduction signal and a RAM reproduction signal for each operational mode. In a mode in which the ROM and the RAM are concurrently reproduced, the ROM1 signal is used as the LD feedback signal, the ROM signal is detected from the ROM2 signal, and the RAM signal is constantly detected from the RAM signal, which is the output of the differential amplifier 430. In a mode in which only the ROM is reproduced, the ROM2 signal is used as the LD feedback signal, and the ROM signal is detected from the ROM1 signal. In a mode in which only the RAM is reproduced, the ROM1 signal is used as the LD feedback signal, and the RAM signal is constantly detected from the RAM signal, which is the output of the differential amplifier 430. In a mode in which the ROM is reproduced while concurrently writing to the RAM, the ROM2 signal is used as the LD feedback signal, and the ROM signal is detected from the ROM1 signal.

Next, a description is given of a mode in which the ROM and the RAM are concurrently reproduced.

In the mode in which the ROM and the RAM are concurrently reproduced, a MO signal recorded in the recording layer, which is formed on the phase pits, is read. Hence, the RAM signal, which is the output of the differential amplifier 430 shown in FIG. 4, is superimposed with noise components under the influence of the phase pits formed under the recording layer. For this reason, the ROM1 signal, which is the output of the summing amplifier 429, is fed back to the laser diode driver 431, thereby controlling the luminescence intensity of the laser diode 401 to be modulated in such a manner that the influence of the phase pits is cancelled. Ideally, after such a process is performed on the ROM1 signal, the amplitude thereof becomes 1/control loop gain of the LD feedback loop. That is, the ROM1 signal becomes a substantially flat signal.

On this occasion, the APC photodetector 413 is detecting the modulation degree of the luminescence intensity of the laser diode 401. Accordingly, the output signal of the APC photodetector 413, that is, the amplified ROM2 signal, is a reproduction signal of the phase pits. In the aforementioned manner, it is possible to concurrently detect the ROM signal from the ROM2 signal, while detecting the RAM signal.

FIG. 6 shows the structure of a sub-code 600 of a data part of a compact disk. The sub-code 600 includes a synchronization signal 601, a control signal 602, an address 603, a data part 604, and a CRC part 606. The data part 604 is formed by P, Q, R, S, T, U, V and W channels.

Figure 7A:
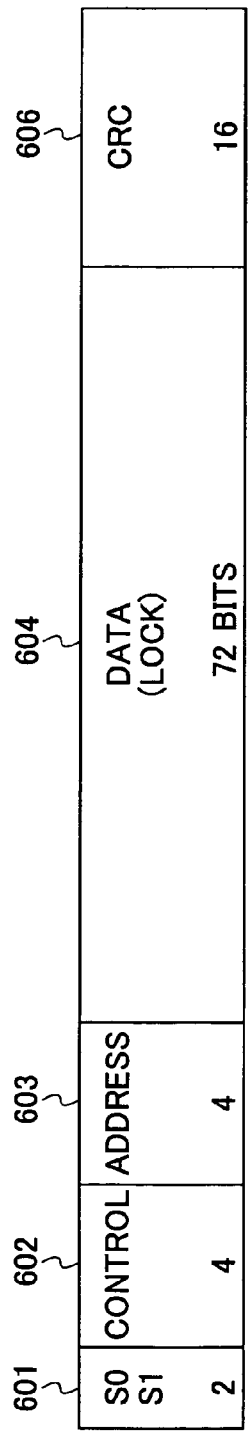
FIG. 7A is a schematic diagram showing an exemplary structure of a sub-code of a ROM portion.
Figure 7B:
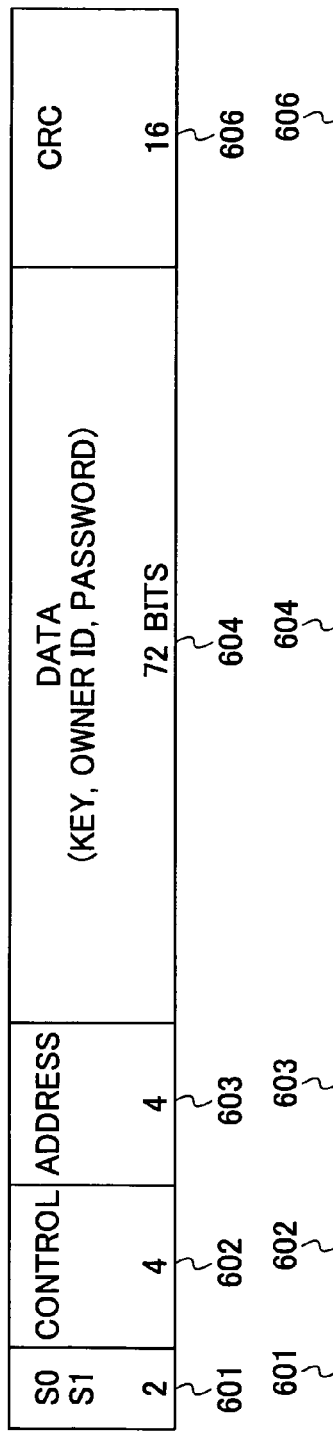
FIG. 7B is a schematic diagram showing an exemplary structure of a sub-code of a RAM portion.
Figure 8A:
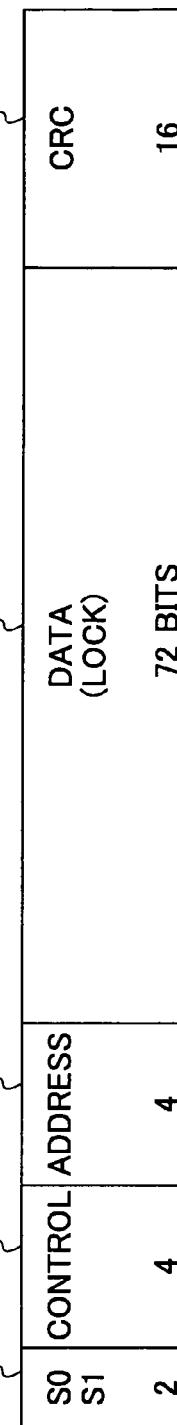
FIG. 8A is a schematic diagram showing an exemplary structure of the sub-code of the ROM portion.
Figure 8B:
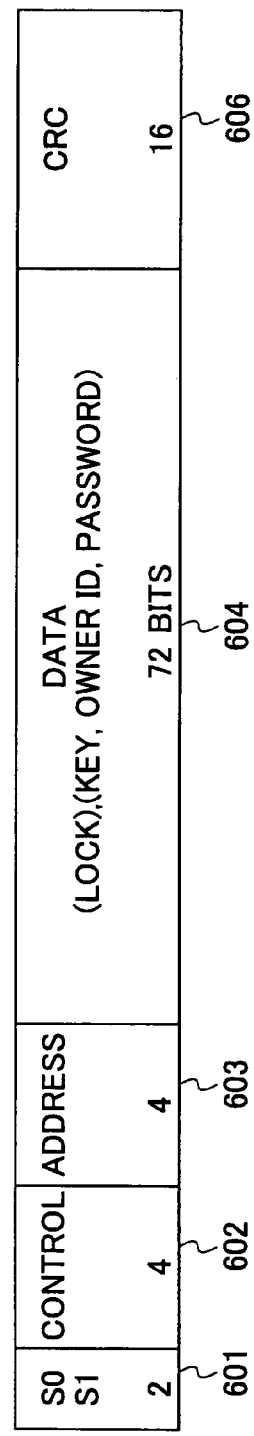
FIG. 8B is a schematic diagram showing an exemplary structure of the sub-code of the RAM portion.

A sub-code area, having the same structure as the sub-code 600 of the data part of the compact disk shown in FIG. 6, is also provided in each of the ROM portion and the RAM portion of the ROM-RAM medium. FIG. 7A shows an exemplary structure of a sub-code of the ROM portion. FIG. 7B shows an exemplary structure of a sub-code of the RAM portion. FIG. 8A shows an exemplary structure of a sub-code of the ROM portion. FIG. 8B shows an exemplary structure of a sub-code of the RAM portion. In FIGS. 7A, 7B, 8A and 8B, those parts that are the same as those corresponding parts in FIG. 6 are designated by the same reference numerals. According to the specification of a compact disk, since the methods for using the P and Q channels of the sub-code are already determined, the other information is recorded in the R through W channels. For example, a lock for identifying a user may be recorded in the data part of the sub-code of the ROM portion. On the other hand, a key, an owner ID, a password and the like for identifying a user may be recorded in the data part of the sub-code of the RAM portion.

A lock may be further recorded in the data part of the sub-code of the RAM portion.

In the present invention, in the ROM-RAM medium, information indicating association with the data of the ROM portion is recorded in any of the R through W channels of the sub-code 600 of the data part of the RAM portion.

Next, referring to FIGS. 9, 10, 11A and 11B, a description is given of an embodiment of ROM-RAM data association according to the present invention. This embodiment may be applied to, for example, the case where an electronic publication is modified afterward.

Figure 9:
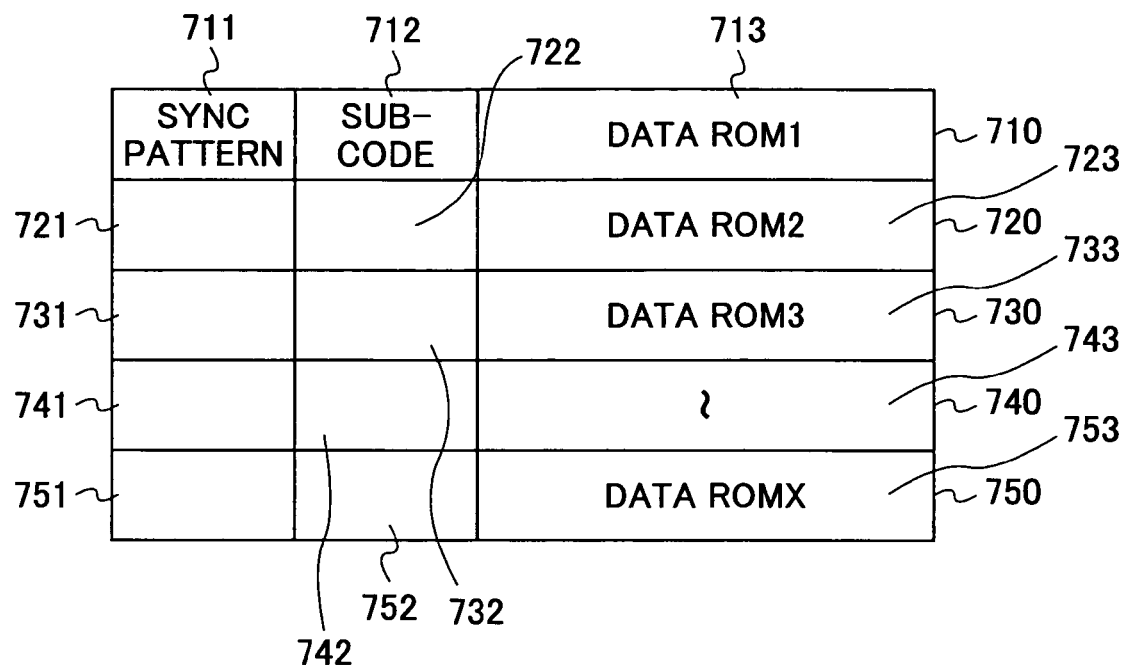
FIG. 9 is a schematic diagram showing the format of a signal recorded in the ROM portion.

FIG. 9 shows the format of a signal recorded in the ROM portion. The data recorded in the ROM portion are formed by blocks 710, 720, 730, 740 and 750, for example. The blocks 710, 720, 730, 740 and 750 are formed by synchronization patterns (sync patterns) 711 through 751, sub-code parts 712 through 752, and user data parts 713 through 753, respectively. The data part 604 of the sub-code 600 shown in FIG. 6 corresponds to each of the sub-code parts 712 through 752. DATA ROM1 is recorded in the user data part 713, DATA ROM2 is recorded in the user data part 723, DATA ROM3 is recorded in the user data part 733, and DATA ROMX is recorded in the user data part 753. At the time of manufacturing of a ROM-RAM medium, only the ROM portion is formed on the ROM-RAM medium, and the RAM portion remains unformed.

Figure 10:
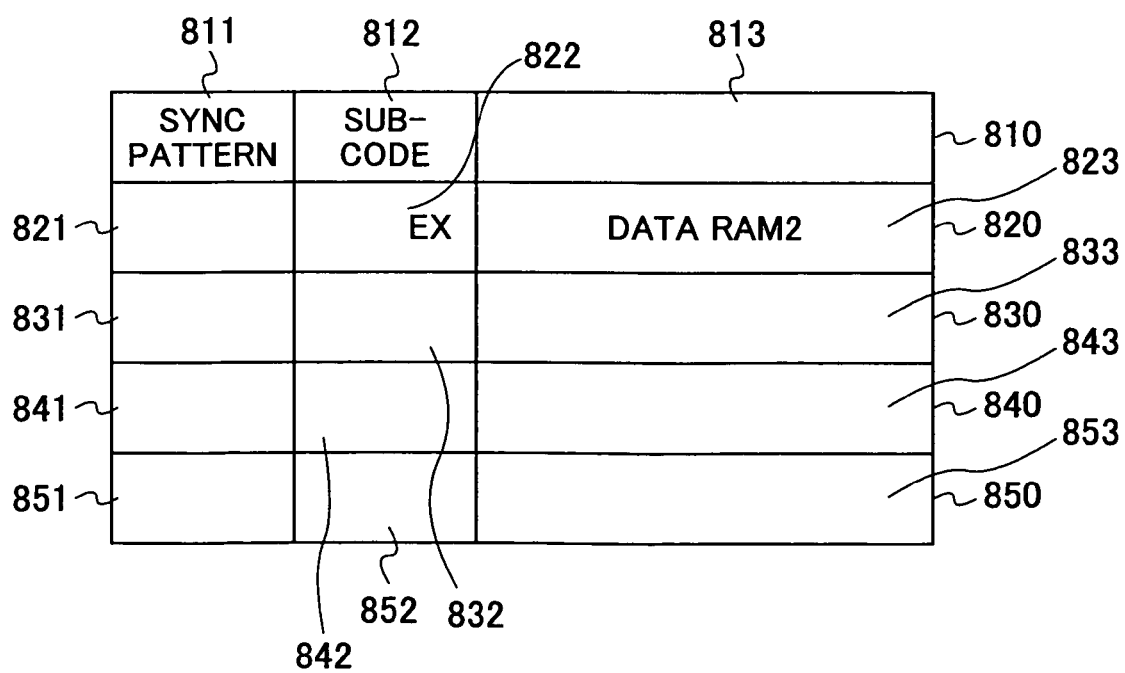
FIG. 10 is a schematic diagram showing the format of a signal recorded in the RAM portion.

FIG. 10 shows the format of a signal recorded in the RAM portion after the medium is manufactured. Data recorded in the RAM portion are formed by blocks 810, 820, 830, 840 and 850, for example. The blocks 810 through 850 are formed by synchronization patterns (sync patterns) 811 through 851, sub-code parts 812 through 852, and user data parts 813 through 853, respectively. The data part 604 of the sub-code 600 shown in FIG. 6 corresponds to each of the sub-code parts 812 through 852. The blocks 810 through 850 of the RAM portion are recorded at positions corresponding to the blocks 710 through 750 of the ROM portion, respectively. In FIG. 10, DATA RAM2 is recorded in the user data part 823, and the sub-code part 822 records therein information (indicated by EX in FIG. 10) representing reproduction by replacing the DATA ROM2 with the DATA RAM2.

Figure 11A:
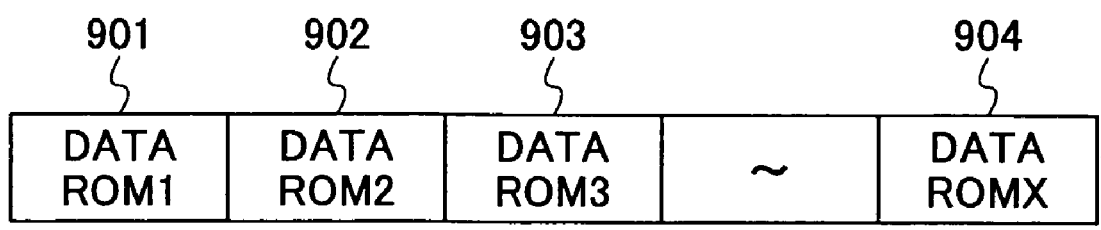
FIG. 11A is a schematic diagram showing a simple example of the reproduction state of a ROM-RAM medium.
Figure 11B:
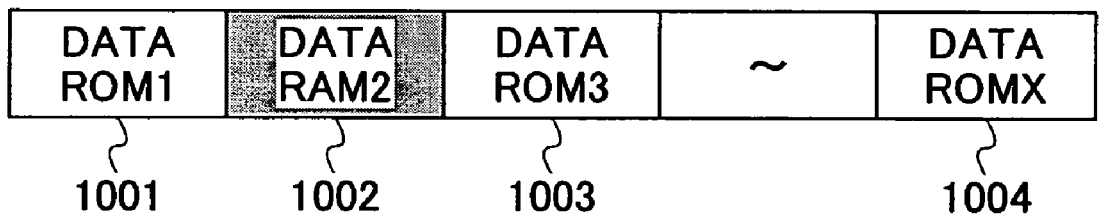
FIG. 11B is a schematic diagram showing a simple example of the reproduction state of a ROM-RAM medium.

FIGS. 11A and 11B show reproduction states of a ROM-RAM medium including a ROM portion having the data shown in FIG. 9 and a RAM portion having the data shown in FIG. 10.

FIG. 11A shows, for example, the case of reproducing an electronic publication with no modification. In this case, since data are not stored in the RAM portion, the data recorded in the user data parts 713 through 753 in the blocks 710 through 750, respectively, are sequentially reproduced as shown in FIG. 11A. Thus, in the case of FIG. 11A, the DATA ROM1 (901), the DATA ROM2 (902), the DATA ROM3 (903), and the DATA ROMX (904) are sequentially reproduced.

On the other hand, FIG. 11B shows the case where the original electronic publication is modified, and the data DATA RAM2, corresponding to the modification, is recorded in the data part 823 of the RAM portion. In this case, similar to the above-mentioned case shown in FIG. 11A, the DATA ROM1 (1001) is reproduced from the user data part 713 in the block 710 of the ROM portion. However, next, the DATA RAM2 (1002) is reproduced from the user data part 823 of the RAM portion based on the information (indicated by EX in FIG. 10) that is recorded in the sub-code 822 of the RAM portion and represents replacement of the DATA ROM2 with the DATA RAM2. Subsequently, as in the case shown in FIG. 11A, the DATA ROM3 (1003) and the DATA ROMX (1004) are sequentially reproduced.

In this case, as mentioned above, it is preferable that the DATA RAM2 be recorded in the user data part 823 of the RAM portion so that the DATA RAM2 is recorded at physically the same position as the user data part 723 of the ROM portion, where the DATA ROM2 is recorded.

In fields of application such as video electronic publishing, there exists a plurality of such portions in data reproduced in a seamless manner, that is, without track jump.

Figure 12A:
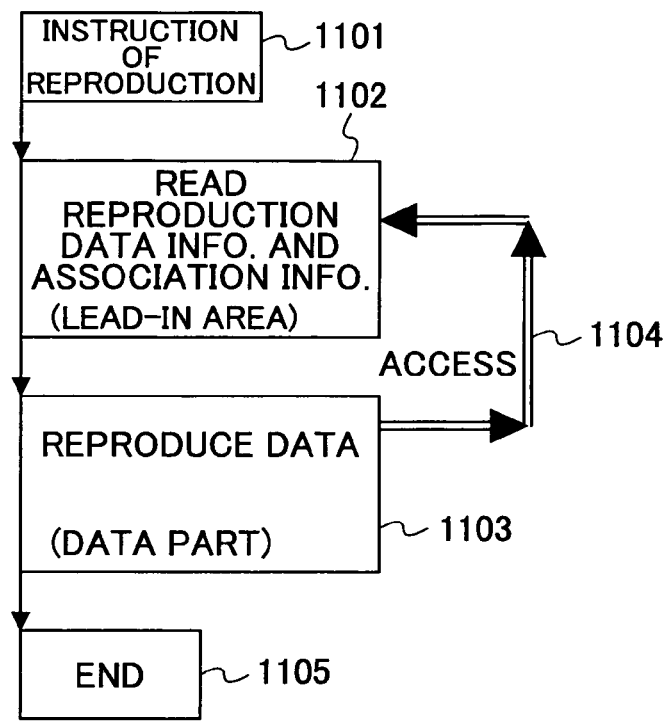
FIG. 12A is a flowchart for explaining the case where replacement information is recorded in a lead-in area.

FIG. 12A shows an access method in the case where the replacement information is recorded in the lead-in area 101 shown in FIG. 1. When reproduction is directed in step 1101, the recording/reproducing apparatus 400 shown in FIG. 4 accesses in step S1102 the lead-in area 101 of the RAM portion shown in FIG. 1. In step 1102, reproduction data information and association information, which are recorded in the lead-in area 101 of the RAM portion, are read, and data blocks of the RAM portion to be reproduced are determined based on the information. In step 1103, the data blocks are accessed to reproduce data. After a predetermined amount of data are reproduced, the lead-in area 101 of the RAM portion shown in FIG. 1 is accessed again in step S1104. The above-mentioned operation of step 1102 is repeated. Finally, in step 1105, the reproduction of data ends.

In the aforementioned manner, when the replacement information is recorded in the lead-in area 101 shown in FIG. 1, the data part 102 and the lead-in area 101, which are shown in FIG. 1, are frequently and repeatedly accessed. Thus, it becomes possible to perform seamless reproduction.

Figure 12B:
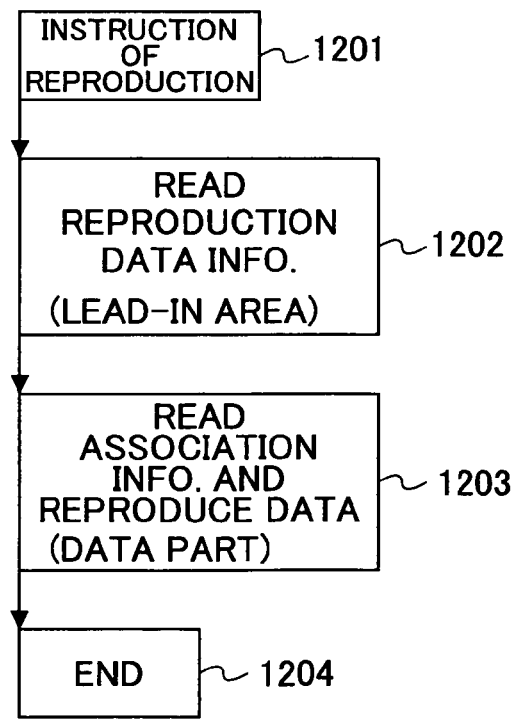
FIG. 12B is a flowchart for explaining the case where the replacement information is recorded in the sub-code area of the data part of the RAM portion.

FIG. 12B shows an access method in the case where the replacement information is recorded in the sub-code area of the data part of the RAM portion according to the present invention.

Referring to FIG. 12, when reproduction is directed in step 1201, the recording/reproducing apparatus 400 shown in FIG. 4 accesses in step 1202 the lead-in area 101 of the RAM portion shown in FIG. 1. In step 1202, reproduction data information recorded in the lead-in area 101 of the ROM portion is read, and data blocks of the ROM portion to be reproduced are determined based on the information. In step 1203, the data blocks of the ROM portion are accessed to reproduce data of the ROM part. The reproduction is continued while reproducing the data of the ROM portion and reproducing the replacement information recorded in the sub-code part of the RAM portion. The data recorded in the RAM portion are reproduced in accordance with the replacement information. When reproduction of data corresponding to a replacement part of the RAM portion ends, the data of the ROM portion is reproduced again. Finally, in step 1204, the reproduction of data ends.

As mentioned above, in the present invention, since the replacement information is recorded in the sub-code area of the data part of the RAM portion, unlike FIG. 12A, the lead-in area 101 is not unnecessarily accessed during reproduction of data.

Next, a description is given of another embodiment of the present invention. In this embodiment, access management information with respect to users is recorded in the sub-code part, and different reproduction can be performed for each user based on the access management information. User registration information is recorded in a sub-code area provided in the lead-in area of the RAM portion. In this embodiment, three users A, B and C are registered, for example. It is also possible to record, in the sub-code area provided in the lead-in part of the RAM part, the number of times the ROM portion and the RAM portion are accessed by a user, and history information such as the number of times the ROM portion and the RAM portion are concurrently reproduced. User management is simplified by recording such information in the sub-code area provided in the lead-in area of the RAM portion.

Figure 13:
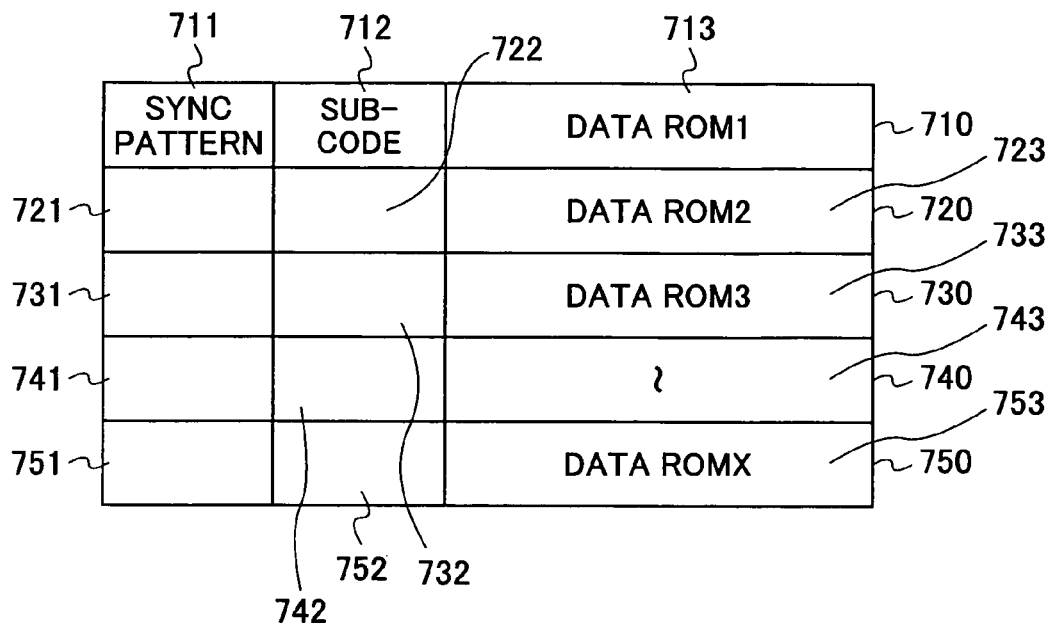
FIG. 13 is a schematic diagram showing the format of a signal recorded in the ROM portion.
Figure 14:
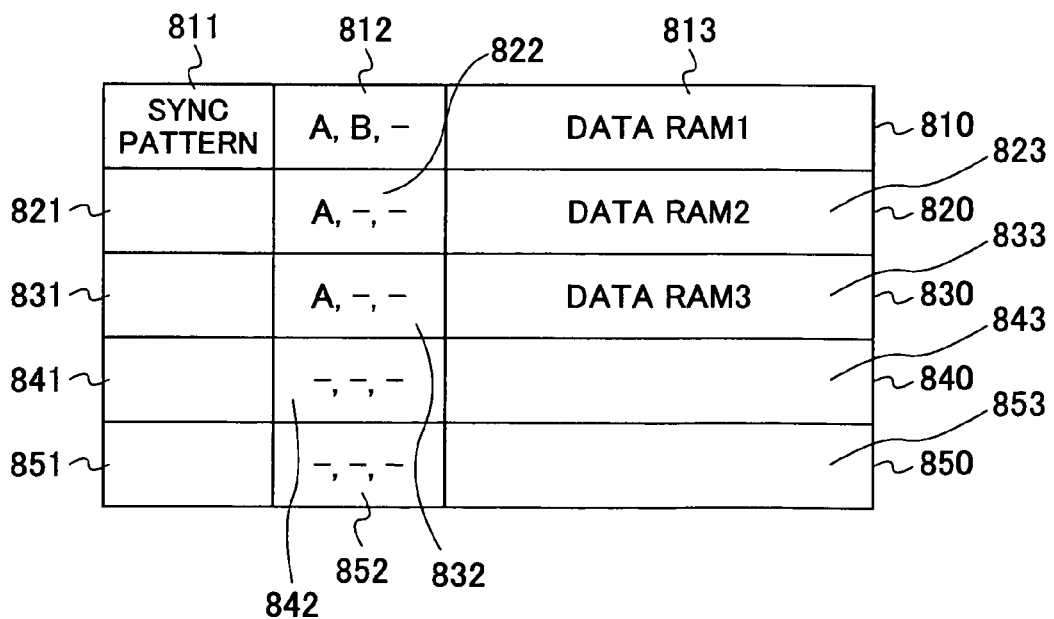
FIG. 14 is a schematic diagram showing the format of a signal recorded in the RAM portion.

In FIGS. 13 and 14, those parts that are the same as those corresponding parts in FIGS. 9 and 10 are designated by the same reference numerals. In this embodiment, access management is performed for each of the three registered users A, B and C in accordance with the access management information based on the user registration information.

Referring to FIG. 14, the access management information with respect to the users A, B and C is recorded in the sub-code parts 812, 822 and 832 of the RAM portion, respectively. Here, "A" "B" and "-" recorded in the sub-code part 812 of the RA portion are information representing the types of concurrent reproduction permission: the users "A" and "B" can reproduce the DATA RAM1 recorded in the data part 813, but the user "C" cannot reproduce the same. "A", "-" and "-" recorded in the sub-code part 822 of the RAM portion represent that the user A can reproduce the DATA RAM2 recorded in the data part 823, but the users B and C cannot reproduce the same. Further, "-", "-" and "-" recorded in the sub-code parts 842 and 852 of the RAM portion represent that the users A, B and C cannot reproduce the data recorded in the data parts 843 and 853.

Figure 15:
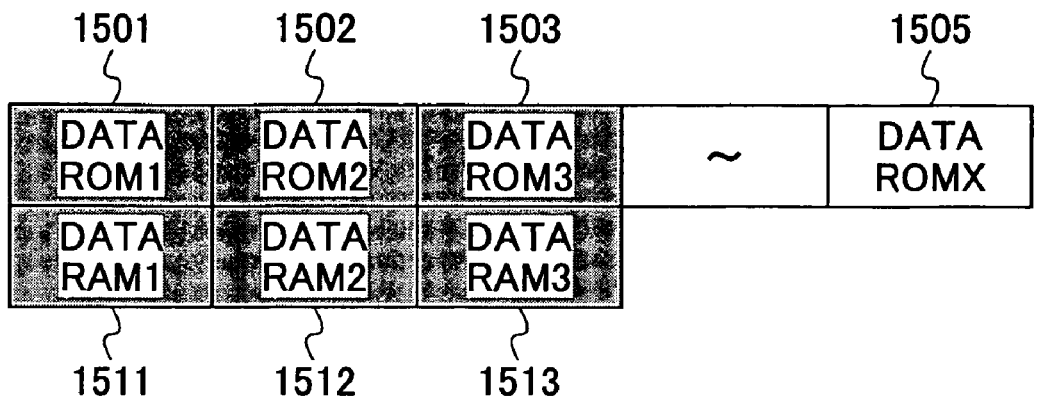
FIG. 15 is a schematic diagram showing a reproduction process with respect to a user A.
Figure 16:
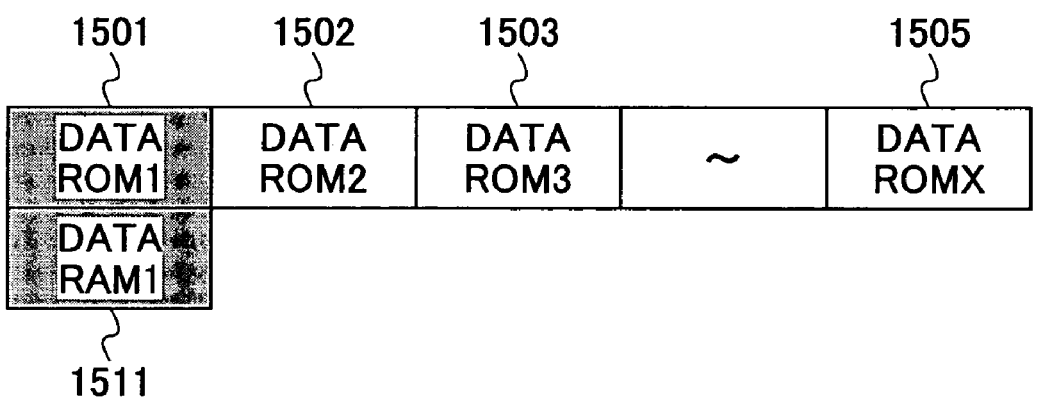
FIG. 16 is a schematic diagram showing a reproduction process with respect to a user B.
Figure 17:
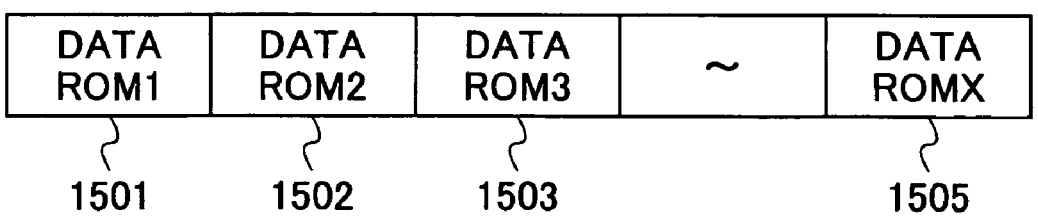
FIG. 17 is a schematic diagram showing a reproduction process with respect to a user C.

FIGS. 15, 16 and 17 show reproduction processes for the users A, B and C, respectively. As shown in FIG. 15, it is possible for the user A to concurrently reproduce the ROM portion and the RAM portion in the parts of the DATA ROM1 (1501) and the DATA RAM1 (1511), the DATA ROM2 (1502) and the DATA RAM2 (1512), and the DATA ROM3 (1503) and the DATA RAM3 (1513). As shown in FIG. 16, it is possible for the user B to concurrently reproduce the ROM portion and the RAM portion in the part of the DATA ROM1 (1501) and the DATA RAM1 (1511). On the other hand, as shown in FIG. 17, the user C can reproduce only the ROM portion from the DATA ROM1 (1501) to the DATA ROMX (1505), and reproduction of the RAM portion is prohibited for the user C. In the aforementioned manner, by recording the access management information for users in the sub-code parts of the data part of the RAM portion, it is possible to seamlessly perform reproduction in a different mode for each of the users without accessing the lead-in area for each reproduction data unit.

Figure 18:
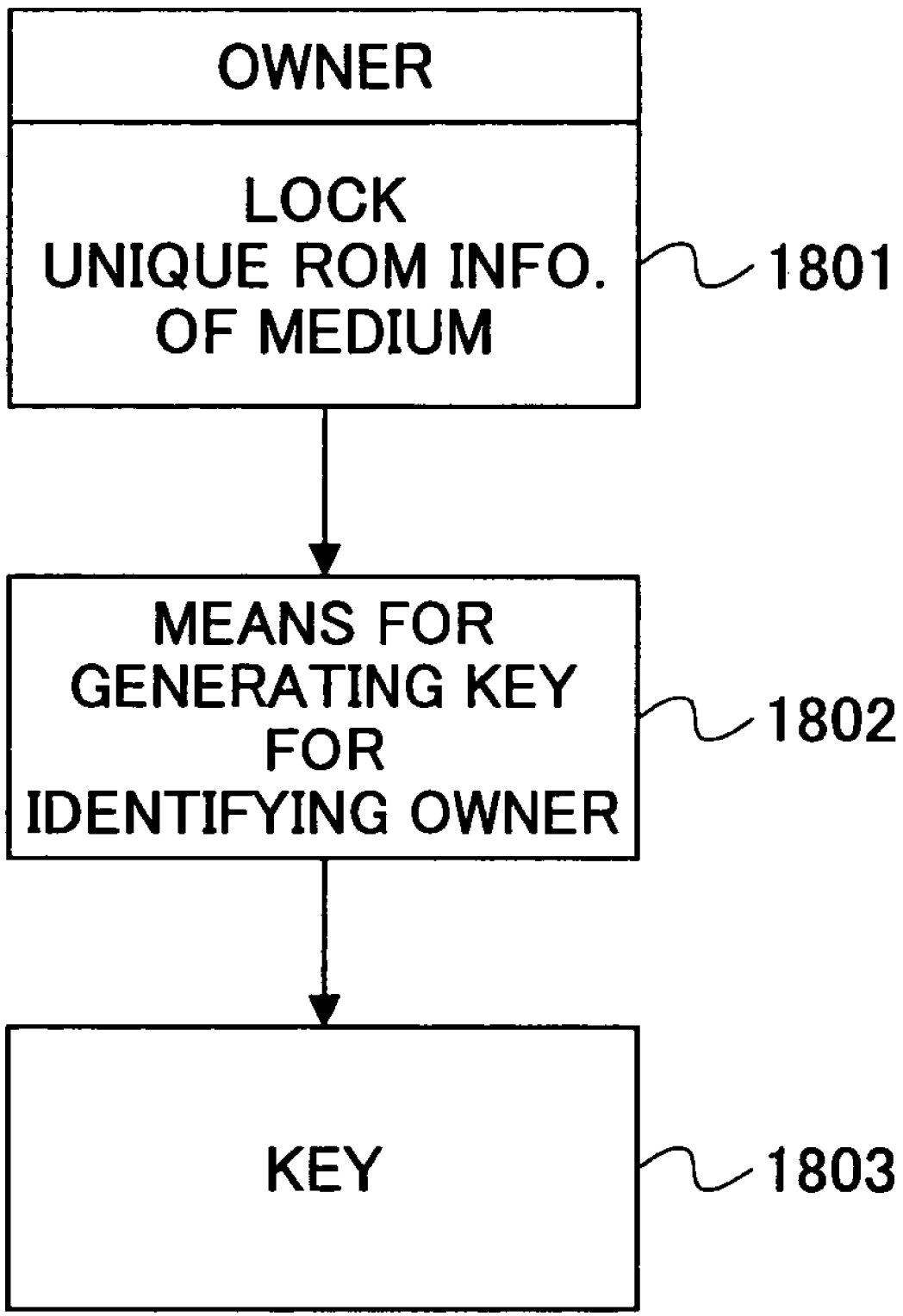
FIG. 18 is a schematic diagram showing an owner identification part.
Figure 19:
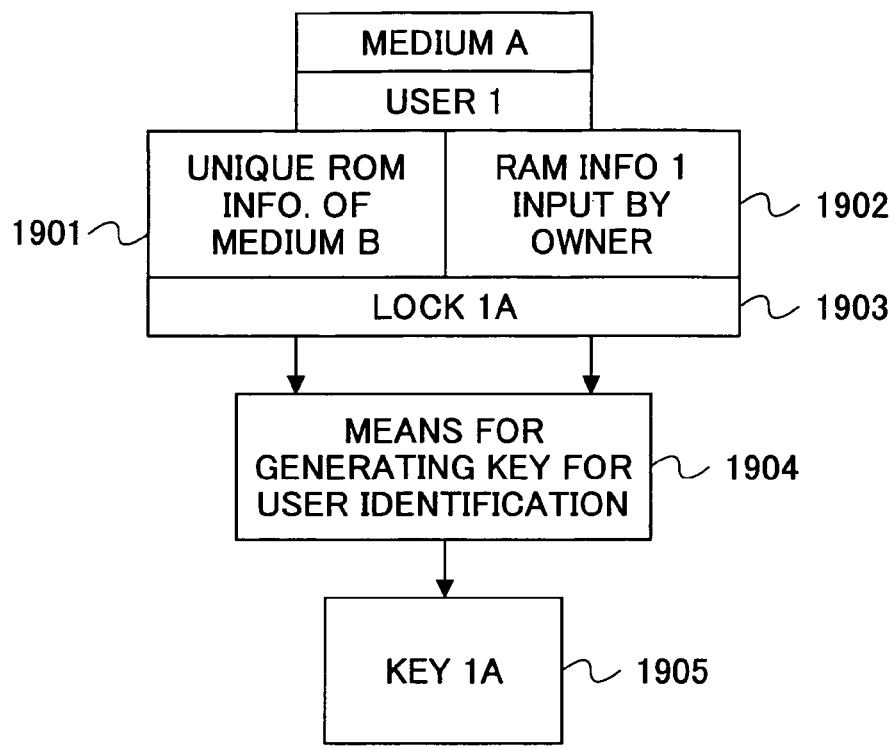
FIG. 19 is a schematic diagram showing a user identification part.
Figure 20:
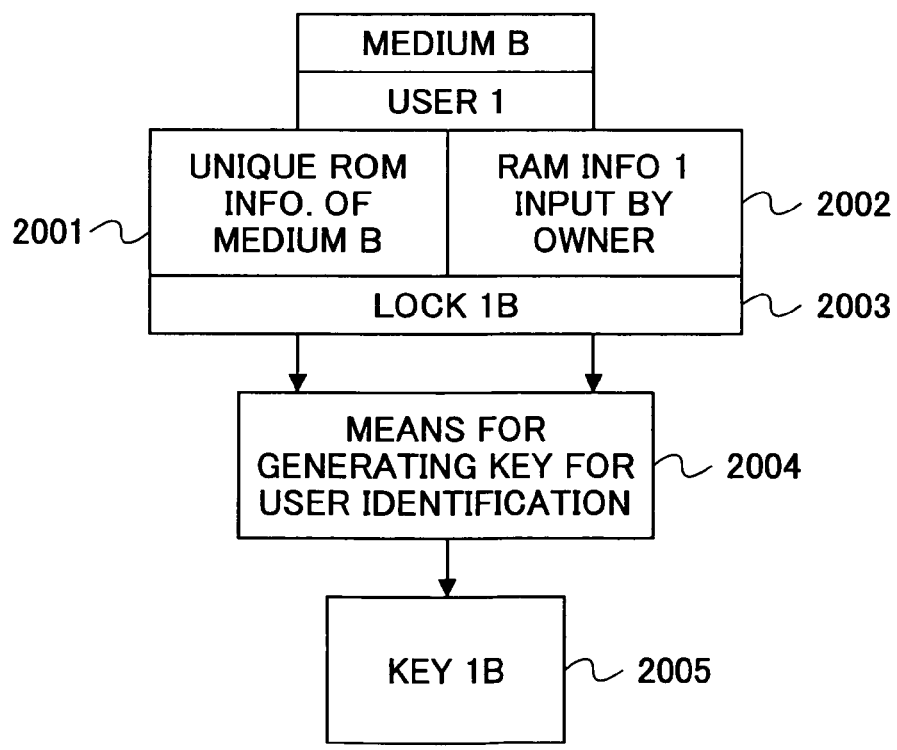
FIG. 20 is a schematic diagram showing the user identification part.

FIGS. 18, 19 and 20 show an owner of a ROM-RAM medium and user identification means. The user identification means are performed by the recording/reproducing apparatus for a ROM-RAM medium, which apparatus is described above with reference to FIG. 4.

FIG. 18 shows an embodiment for generating a key for identifying the owner of a ROM-RAM medium to which a medium ID is added. The medium ID is ROM data unique to a ROM-RAM medium.

In step S1801, means for generating a key for identifying the owner of a ROM-RAM medium read, from the ROM-RAM medium, a medium ID, which is ROM data unique to the ROM-RAM medium. In step S1802, by assuming the read medium ID as a lock, the key is generated. In step S1803, when the medium is purchased by a user, the key can be obtained. Thereafter, when the recording/reproducing apparatus requests an input of owner information upon reproduction of the ROM-RAM medium, the owner can continue reproduction by inputting the key.

Next, a description is given of a method for generating a key for user identification according to the present invention. The method for generating a key for identifying a user of a ROM-RAM medium is performed by the main controller 415 of the recording/reproducing apparatus for a ROM-RAM medium shown in FIG. 4.

Referring to FIG. 19, a description is given of a method for generating a key 1A for a ROM-RAM medium A. In the method for generating a key for identifying a user of a ROM-RAM medium, a medium ID, which is ROM data unique to the ROM-RAM medium A, is read from the ROM-RAM medium A in step 1901. In step 1902, based on the read medium ID, the owner inputs RAM information 1, which is to be recorded in the sub-code part of the RAM portion. The RAM information 1 is information for identifying the user 1. Referring to FIG. 4, the RAM information 1 is input by the owner of the ROM-RAM medium A via the input/output device 441, and is transmitted to the main controller 415 via the input/output circuit 440 and the interface 439. In step 1903, based on the read medium ID and the RAM information 1 input by the owner of the ROM-RAM medium A, a new lock 1A, which is different from the medium ID, is generated. In step 1904, the key 1A for identifying the user 1 is generated based on the lock 1A, which is generated based on the read medium ID and the RAM information 1. In step 1904, the owner is notified of the key 1A for identifying the user 1 via the input/output circuit 440. The key 1A for the user 1 thus generated is notified to the user 1 from the owner. Thereby, the user 1 can obtain the key 1A. Thereafter, when the recording/reproducing apparatus requests an input of user confirmation information upon reproduction of the ROM-RAM medium A, the user 1 can continue reproducing of the ROM-RAM medium A by inputting the key 1A.

Next, referring to FIG. 20, a description is given of a method for generating a key 1B for a ROM-RAM medium B with respect to the same user 1. In the method for generating a key for identifying a user of a ROM-RAM medium, in step 2001, a medium ID, which is ROM data unique to the ROM-RAM medium B, is read from the ROM-RAM medium B. In step 2002, based on the read medium ID, the owner inputs RAM information 1, which is to be recorded in the sub-code part of the RAM portion. The RAM information 1 is information for identifying the user 1, and is the same as the RAM information 1 described with reference to FIG. 19. Referring to FIG. 4, the RAM information 1 is input by the owner of the ROM-RAM medium A via the input/output device 441, and is transmitted to the main controller 415 via the input/output circuit 440 and the interface 439. In step 2003, based on the read medium ID and the RAM information 1 that is input by the owner of the ROM-RAM medium B, a new lock 1B, which is different from the medium ID, is generated. The lock 1B is different from the lock 1A generated in step 1903 of FIG. 19. That is, even if the owner of the ROM-RAM medium B inputs the RAM information 1 with respect to the same user 1, since the medium ID is different when the target ROM-RAM medium is different, another lock 1B is generated. This simplifies management of users by the owner. In step 2004, a key 1B for identifying the user 1 is generated based on the lock 1B, which is generated based on the read medium ID and the RAM information. In step 2004, the owner of the ROM-RAM medium B is notified of the key 1B for identifying the user 1 via the input/output circuit 440. The key 1B for the user 1 thus generated is notified to the user 1 from the owner. Thereby, the user 1 can obtain the key 1B. Thereafter, when the recording/reproducing apparatus requests an input of user confirmation information upon reproduction of the ROM-RAM medium B, the user 1 can continue reproduction by inputting the key 1B.

As mentioned above, even if RAM information that is input by an owner in order to generate a lock and a key for a user is constantly the same such as the RAM information 1, a different key is generated for each ROM-RAM medium, such as the key 1A and the key 1B. Accordingly, since the same key is not generated for different ROM-RAM media even if the user is the same, it is possible to readily protect data for each medium.

In the above-mentioned embodiment, the description is given of the case where the medium ID is used as the ROM information. However, it is unnecessary to limit the ROM information, which is used for generating a lock and a key for identifying a user, to the medium ID, and ROM information provided in another area may be used. For example, RAM information created by an owner may be recorded in a sub-code area for recording ROM information and a sub-code area of the RAM portion, which sub-code area is physically the same or close to the sub-code area for recording the ROM information, and a key and a lock for user identification may be generated based on the ROM information and the RAM information that are read by ROM-RAM concurrent reproduction. As mentioned above, information forming the basis for generating a lock and a key may be recorded in any area on a medium. Accordingly, confidentiality with respect to the recording position of a lock and a key is increased, and unnecessary accesses for user identification are further decreased.

Figure 21:
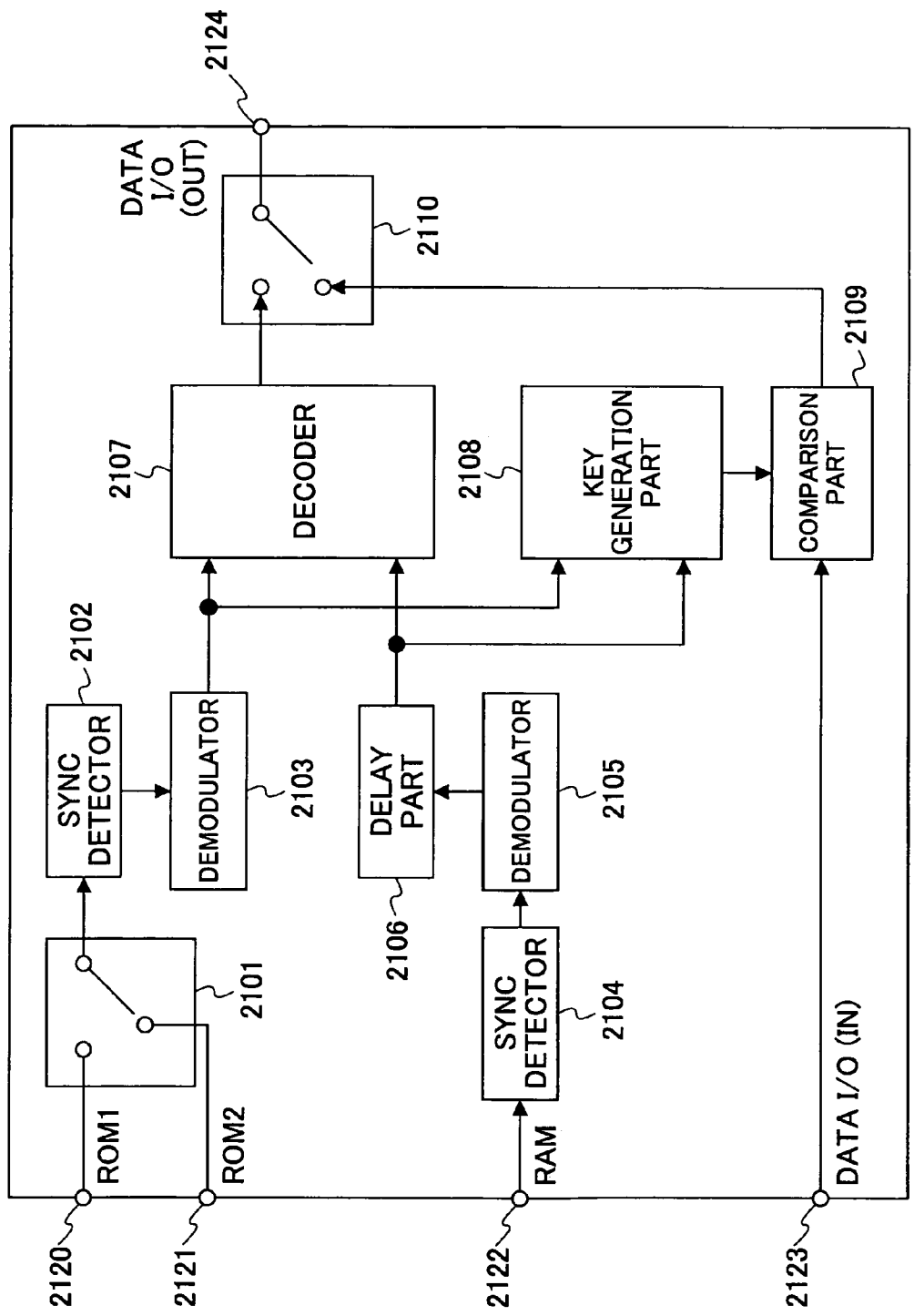
FIG. 21 is a schematic diagram showing signal processing performed by a main controller 415 shown in FIG. 4 in order to identify a user according to the present invention.

Next, a description is given of a method for identifying a user according to the present invention. The method for identifying a user of a ROM-RAM medium is performed by the main controller 415 of the recording/reproducing apparatus for a ROM-RAM medium shown in FIG. 4. FIG. 21 is a schematic block diagram of signal processing performed by the main controller 415 in order to identify a user according to the present invention. The ROM signal 1, which is output to the main controller 415 from the summing amplifier 429 shown in FIG. 4, is input to an input part 2120. The ROM signal 2, which is output to the main controller 415 from the amplifier 414 shown in FIG. 4, is input to an input part 2121. The RAM signal, which is output to the main controller 415 from the differential amplifier 430 shown in FIG. 4, is input to an input part 2122. An input part 2123 receives an input signal from the interface 439 shown in FIG. 4. On the other hand, an output part 2124 outputs a signal to the interface 439 shown in FIG. 4.

A switch 2101 is controlled to select either the ROM1 or the ROM2 in the main controller 415 in accordance with the embodiment described above with reference to FIG. 5. The selected signal, i.e., one of the ROM1 and the ROM2, is transmitted to a synchronization signal detector (sync detector) 2102, and a synchronization signal is detected. Based on the detected synchronization signal, main information and the data part of a sub-code are transmitted to and demodulated by a demodulator 2103. The demodulated signal is input to a decoder 2107 and a key generation part 2108.

On the other hand, the RAM signal is transmitted to the synchronization signal detector 2104, and a synchronization signal is detected. Based on the detected synchronization signal, a main signal and the data part of a sub-code are transmitted to and demodulated by a demodulator 2105. The demodulated signal is input to the decoder 2107 and the key generation part 2108 via a delay part 2106 so as to adjust synchronization with the main information and the sub-code of the ROM portion.

The decoder 2107 includes a function of recognizing the association information associating the data of the ROM portion with that of the RAM portion and the access management information of users, which information is mentioned above, and re-mixing the data. The above-mentioned function of the present invention is realized by the decoder 2107, and data are output to the output part 2124 via a switch 2110 and transmitted to the interface 439. The switch 2110 is controlled in the main controller 415 as to whether to select the output of the decoder 2107 or the output of a comparison part 2109.

As for owner identification and user identification, it is required to input keys that are generated in accordance with the above-mentioned method for generating a key for owner identification and method for generating a key for user identification. When an owner or a user desires to continue reproduction of a ROM-RAM medium, the owner or the user inputs the key for the ROM-RAM medium.

The comparison part 2109 compares the key recorded in a sub-code of the ROM portion and the RAM portion with the key input by the owner or the user. The comparison result, that is, a match or a mismatch, is output to the output part 2124 via the switch 2110, and is transmitted to the interface 439 shown in FIG. 4.

The present invention is not limited to the specifically disclosed embodiments, and variations and modifications may be made without departing from the scope of the present invention.

What is claimed is:

1. A ROM-RAM recording medium including a ROM portion in which main information is recorded by a physical change on an optically transparent substrate and a RAM portion formed on the ROM portion as a recording layer that allows writing of main information at least once, the ROM portion being provided with a sub-code area for recording sub-information,
    wherein a sub-code area for recording sub-information is provided in the RAM portion arranged at physically substantially the same position as the sub-code area of the ROM portion in a track direction, and
    wherein user registration information is recorded in the sub-code area provided in a lead-in area of the RAM portion, and access management information based on the user registration information is recorded in the sub-code area provided in a data recording area of the RAM portion.

2. The ROM-RAM medium as claimed in claim 1, wherein the access management information based on the user registration information recorded in the sub-code area provided in the data recording area of the RAM portion includes a type of concurrent reproduction permission of the main information of the ROM portion and the main information of the RAM portion.

3. The ROM-RAM medium as claimed in claim 1, wherein data access count information is recorded in the sub-code area provided in the lead-in area of the RAM portion, and the data access count information includes history information of concurrent reproduction of ROM data and RAM data.

4. A storage device that records information on or reproduces information from a ROM-RAM recording medium including a ROM portion in which main information is recorded by a physical change and a RAM portion formed as a recording layer on the ROM portion and allowing writing of main information at least once,
    the storage device comprising a user identification part that includes:
    a lock generation part that generates a lock based on ROM information and RAM information;

a key generation part that generates a key based on the lock; and a detector that detects a match between the key generated based on the lock and a key input to the storage device.

5. The storage device as claimed in claim 4, wherein the physical change includes an irregularity.

6. The storage device as claimed in claim 4, wherein the ROM information and the RAM information are recorded at physically substantially the same position in a track direction.

7. A ROM-RAM recording medium including a ROM portion in which main information is recorded by a physical change on an optically transparent substrate and a RAM portion formed on the ROM portion as a recording layer that allows writing of main information at least once, the ROM portion being provided with a sub-code area for recording sub-information, wherein a sub-code area for recording sub-information is provided in the RAM portion arranged at physically substantially the same position as the sub-code area of the ROM portion in a track direction, and wherein data access count information is recorded in the sub-code area provided in a lead-in area of the RAM portion, and the data access count information includes history information of concurrent reproduction of ROM data and RAM data.

* * * * *